July 14, 1942.  A. L. PARKER  2,289,382

TUBE COUPLING

Filed Nov. 7, 1940  2 Sheets-Sheet 1

Inventor
Arthur L. Parker
By Mason & Porter
Attorneys

July 14, 1942.   A. L. PARKER   2,289,382
TUBE COUPLING
Filed Nov. 7, 1940   2 Sheets-Sheet 2

Inventor
Arthur L. Parker
By Mason & Porter
Attorneys

Patented July 14, 1942

2,289,382

UNITED STATES PATENT OFFICE 2,289,382

TUBE COUPLING

Arthur L. Parker, Cleveland, Ohio

Application November 7, 1940, Serial No. 364,707

2 Claims. (Cl. 285—86)

The present invention relates to new and useful improvements in tube couplings, and more particularly to improvements in couplings adapted for securely clamping the flared ends of metal tubes such as are typified in the U. S. Letters Patent 1,893,442 issued to Arthur L. Parker on January 3, 1933.

In tube couplings of the character stated, it sometimes happens that tapered seating surfaces intended for clamping engagement with the flared end of the tube to be clamped become scratched and nicked prior to an assembly of a coupling, with the result that the coupling, when assembled, is not as efficient as it might be and is likely to leak.

An object of the present invention is to provide a novel coupling structure of the character stated in which means is provided for imposing upon the clamped flared end portion of the tube, highly concentrated forces effective to cause the metal of the tube to be deformed into any scratches or nicks in the force opposing clamping surface portions and completely seal the joint.

Another object of the invention is to provide a novel coupling structure of the character stated in which the surfaces of the coupling elements which engage and clamp the flared end of the tube between them are equipped with opposed annular rib and groove equipments effective to deform the clamped tube portion and apply the desired highly concentrated forces mentioned without undesirably thinning the metal of said tube portion at any point.

Another object of the invention is to provide a novel coupling structure of the character stated in which the coupling sleeve portion engageable in clamping relation with the flared tube end portion is so formed and arranged as to be slightly expansible in a manner effective, in combination with the rib and groove equipment, to lock the sleeve on the tube and prevent relative rotation between the sleeve and tube.

Another object of the invention is to provide a novel coupling structure of the character stated in which the coupling sleeve carries the annular rib and the annular rib is undercut in a manner for causing the clamped tube to become positively locked with the sleeve during the deformation of the flared tube end portion by the rib and groove equipments.

With the above and other objects in view that will hereinafter appear, the nature of the invention will be more fully understood by following the detailed description, the appended claims and the several views illustrated in the accompanying drawings.

Figure 1:
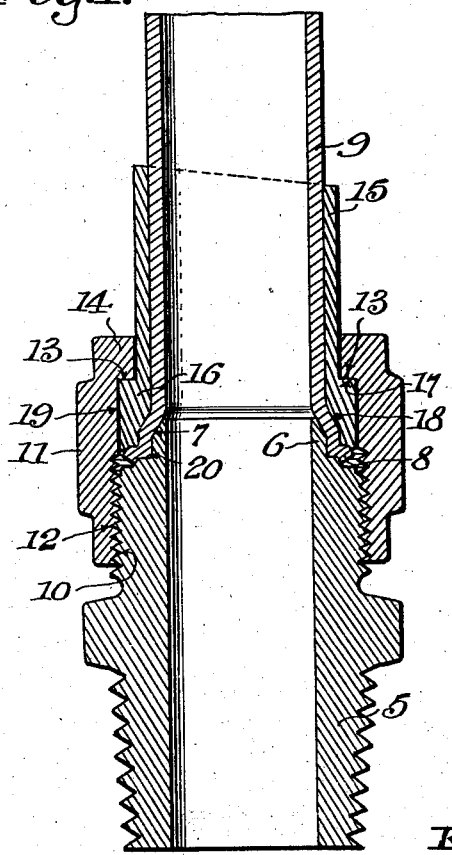
Figure 1 is a central longitudinal section of a tube coupling embodying the invention, the completely clamped, final assembly of the coupling being illustrated.

In the coupling herein disclosed as an example of embodiment of the invention there is included a male member and a female member threadably connected, the female member being formed of two parts, a nut and a clamp sleeve, and the tube to be coupled is firmly clamped between these male and female members.

The male coupling member 5 includes a coniform seat extension 6 which presents a tapered clamping surface 7 for engaging in the flared end 8 of the tube 9 which is to be clamped in the coupling. The male member is externally threaded as at 10 to receive the female member, and it will be observed by reference to Figure 1 of the drawings that the bore in the male member and the bore in the tube to be coupled are substantially the same in diameter.

The female member, which is formed in two parts, comprises a nut or clamp member 11 which is internally threaded as at 12 and includes an abutment 13 formed in an extension 14 extending upwardly from said nut. The second part of the female member comprises a clamp sleeve 15 which surrounds the tube 9 within the nut 11 and extends longitudinally beyond the nut extension 14 in the manner illustrated in Figure 1. This sleeve is provided with a tube clamping head 16 having an abutment shoulder 17 adapted to be engaged by the abutment shoulder 13 on the nut 14. The inner end of the clamping head is flared as at 18 for engaging the flared end 8 of the tube 9. The external diameter of the head 16 is smaller than the internal diameter of the nut 11 so as to provide a clearance space 19.

Figure 2:
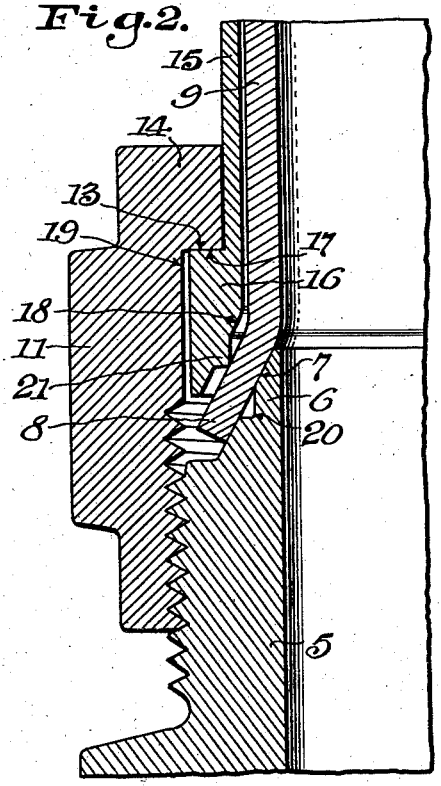
Figure 2 is an enlarged fragmentary sectional view of the coupling structure of Figure 1 and illustrates the loosely assembled condition of the coupling.
Figure 3:
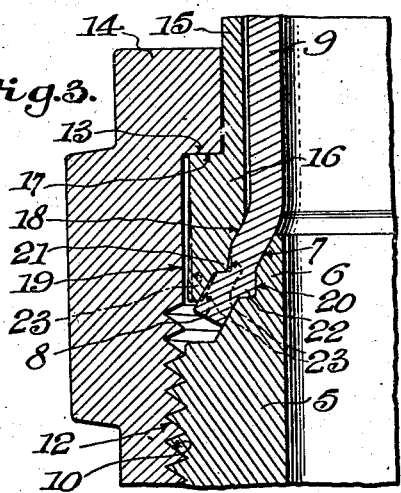
Figure 3 is a view similar to Figure 2 illustrating the completely clamped, final assembly condition of the coupling.

An annular recess or groove 20 is formed in the clamping face 7 of the male member extension 6, and this groove is defined by converging walls one of which is disposed perpendicular to the axis of the coupling, and the other parallel said axis in the manner best illustrated in Figures 2 and 3 of the drawings.

An annular rib 21 projects inwardly from the flared tube clamping surface 18 of the sleeve, and this rib may also be defined by converging wall portions one of which is disposed perpendicular to the axis of the coupling, and the other parallel said axis. It will also be observed by reference to Figure 3 of the drawings that when the coupling is complete the rib equipment 21 is disposed directly opposite the groove equipment 20. See Figures 1 and 3.

When the nut 11 is screwed home on the external threads 11 of the male coupling member 5, the abutment shoulder 13 thereof engages the abutment shoulder 17 of the clamping sleeve and serves to force the respective tapered and flared clamping surfaces 7 and 18 toward each other for clamping the flared end 8 of the tube 9 between them, said sleeve being moved from the loosely assembled position illustrated in Figure 2 to the tight clamping, complete assembly condition illustrated in Figure 3. Because of the opposed relation of the rib and groove equipments 20, 21 hereinbefore described, the metal of the flared end 8 of the tube 9 is deformed between these equipments in the manner illustrated in Figure 3 so as to assure the provision of a very efficient leak-proof seal without objectionably thinning the metal of the tube at any point.

It sometimes happens that the tapered seating surface 7 in couplings of this character becomes scratched or nicked prior to the assembly of a coupling, with the result that the coupling, when assembled, is not as efficient as it might be and is likely to leak. By reason of the provision of the annular rib and groove equipments 20, 21 herein disclosed, and the deformation of the metal in the flared end 8 of the tube 9 as a result of the cooperation of these equipments, highly concentrated force is applied to the tube end at the edge portions of the male projection 6 defining the extremities of the groove 20, and this concentration of force is effective to cause the metal of the tube to deform into any scratches or nicks which might be present in said clamping surface, thereby to assure the provision of a leak-proof joint. It has also been found that by reason of the provision of the rib and groove equipments, in combination with the clearance 19 surrounding the clamping sleeve enlargement, the sleeve grips the tube very securely and prevents any relative rotation between the sleeve and tube. This peculiar gripping action is thought to result from the slight expansion of the sleeve into the clearance 19 in the manner illustrated in Figure 3 of the drawings. This expansion is very slight, probably only .0005, but this is very effective for locking the sleeve onto the tube. The degree of this expansion of the sleeve end from the normal, repose condition thereof is indicated by the dot and dash lines 23 in Figure 3.

Figure 4:
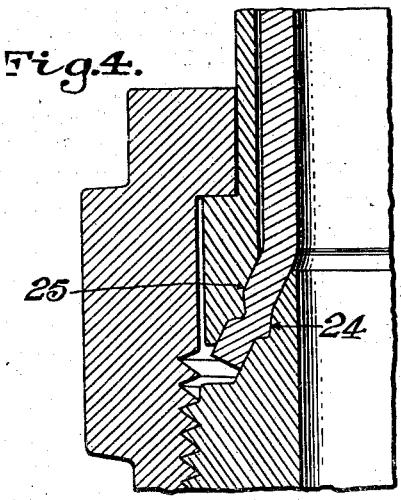
Figure 4 is a view similar to Figure 3 illustrating a modified form of the invention in which a wall of the annular recess equipment is flared, and in which a wall portion of the annular rib equipment is undercut.

In Figure 4 of the drawings there is illustrated a slight modification of the invention in which one of the walls defining the groove equipment is slightly tapered as at 24 instead of being truly parallel with the axis of the coupling. In this modification the wall portion defining the rib equipment which was previously described as parallel with the axis of the coupling, is undercut so as to interlock with the sleeve in the manner indicated at 25. The slight tapering of the wall of the groove equipment as at 24 facilitates disassembly of the coupling.

While specific mention has been made hereinbefore of the advantages of applying highly concentrated forces at the edge portions defining the groove 20 in the male projection 6, it will be obvious that a similar concentration of force will be applied by engagement of the annular rib 21 against the external surface of the flared end 8 of the tube and that this last-mentioned concentration of force will similarly cause the metal of the tube to deform into any scratches or nicks in the engaging sleeve surfaces. It should be obvious also that the invention comprehends the particular opposed cooperative relation of the annular rib and groove equipments herein stressed regardless of whether the groove be formed in the male element extension and the rib on the sleeve, or the rib on the male element extension and the groove in the sleeve.

Figure 5:
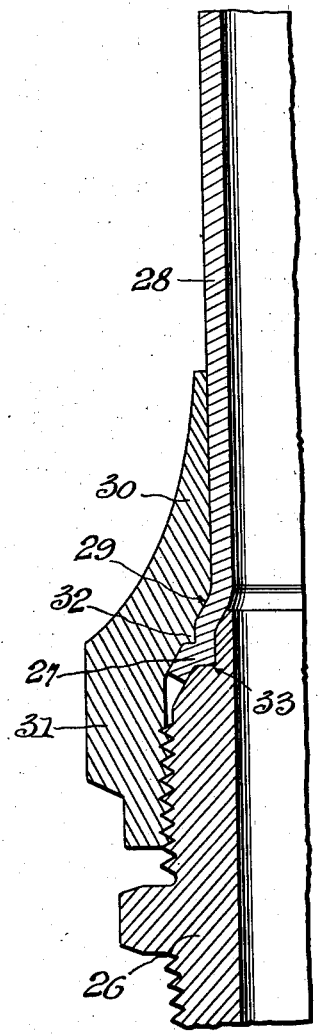
Figure 5 is a view similar to Figure 3 illustrating another modified form of the invention in which the female coupling member directly engages and clamps the tube end.

In Figure 5 there is illustrated an additional slight modification of the invention in which the male coupling member 26 is constructed in the same or substantially the same manner as the member 5 of Figure 1, but in this form of the invention the clamping sleeve is omitted and the flared end 27 of the tube 28 is directly engaged by the flared clamping surface 29 formed in the extension 30 of the internally threaded female coupling member 31, the opposed, flared and tapered clamping surfaces of the members 31 and 26 being provided with opposed, tube flare deforming rib and groove equipments 32 and 33, which function in the manner hereinbefore described.

Figure 6:
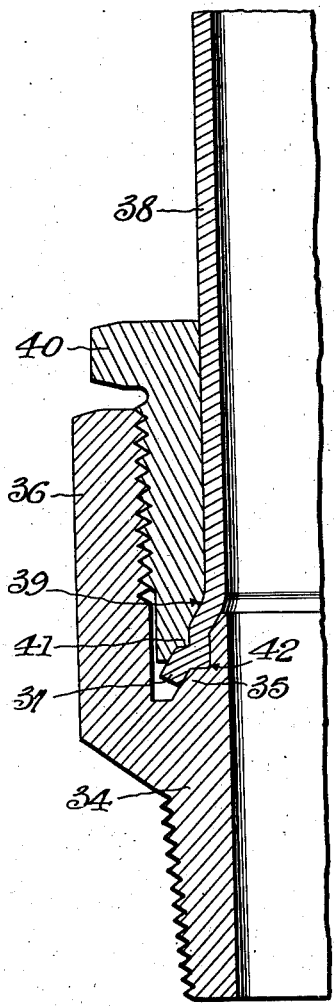
Figure 6 is a view similar to Figure 3 illustrating a further modification of the invention in which one coupling member is threaded into the other and directly engages and clamps the tube end.

Another slight modification of the invention is shown in Figure 6. In this form of the invention the coupling member 34 is equipped with a coniform clamping extension 35 surrounded by an internally threaded nut extension 36. The extension 35 engages in the flared end 37 of the tube 38, and the external surface of the flared tube end is directly engaged by the flared clamping surface 39 in the end of the coupling sleeve 40 threaded into the nut extension 36. The opposed, flared and tapered clamping surfaces of the members 34 and 40 are provided with opposed, tube flare deforming rib and groove equipments 41 and 42 which function in the manner hereinbefore described.

Figure 7:
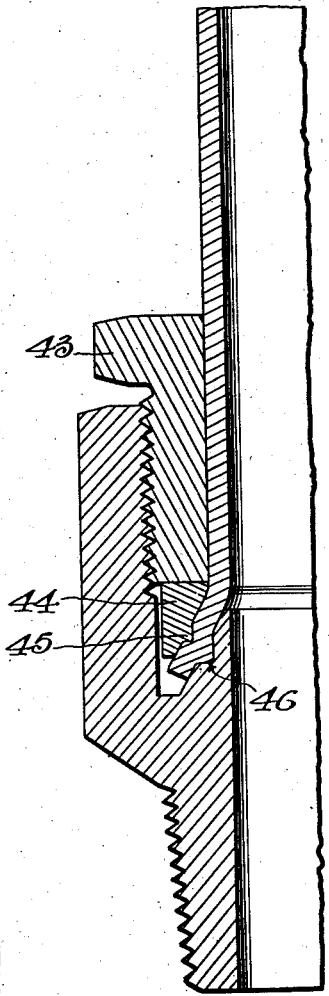
Figure 7 is a view similar to Figure 3 illustrating still another modification of the invention in which one coupling member is threaded into the other and therein presses against a clamping ring which engages and clamps the tube end.

Still another slight modification of the invention is illustrated in Figure 7, the structure being the same as that of Figure 6 except that the coupling sleeve 43, instead of directly engaging the flared tube end, engages a clamping ring 44 which engages said tube end and includes an annular rib 45 for opposing the annular groove 46 of the other coupling member in the manner and for the purpose hereinbefore described.

It is of course to be understood that the details of structure and arrangement of parts may be variously changed and modified without departing from the spirit and scope of my invention.

I claim:

1. In a coupling for tubes having the ends thereof flared, coupling members provided with clamping faces shaped to substantially conform respectively to the inner and outer faces of the flared end of the tube, said clamping faces having directly opposed rib and groove equipments, the inner walls of which extend in the general direction of the axis of the coupling and are spaced a distance substantially equal to the thickness of the flared end of the tube, said rib and groove equipments being effective to deform the flared end of the tube and provide annular areas of highly concentrated force application assuring a leak-proof coupling while substantially maintaining the initial wall thickness of the flared end of the tube at all points.

2. In a coupling for tubes having the ends thereof flared, coupling members having threaded connection, one of said coupling members having a seat engaging within the flared end of the tube and substantially conforming to the shape thereof, the other coupling member having a clamping shoulder, a sleeve surrounding said tube and provided with a clamping head shaped to substantially conform to the outer face of the flared end of the tube, said sleeve having a shoulder adapted to be contacted with by a shoulder on the nut, the clamping faces of the sleeve-head and the seat having opposed rib and groove equipments the inner walls of which extend in the general direction of the axis of the coupling and are spaced a distance substantially equal to the thickness of the flared end of the tube, said rib and groove equipments being effective to deform the flared end of the tube and provide annular areas of highly concentrated force application assuring a leak-proof coupling while substantially maintaining the initial wall thickness of the flared end of the tube at all points.

ARTHUR L. PARKER.